Patented Apr. 18, 1944

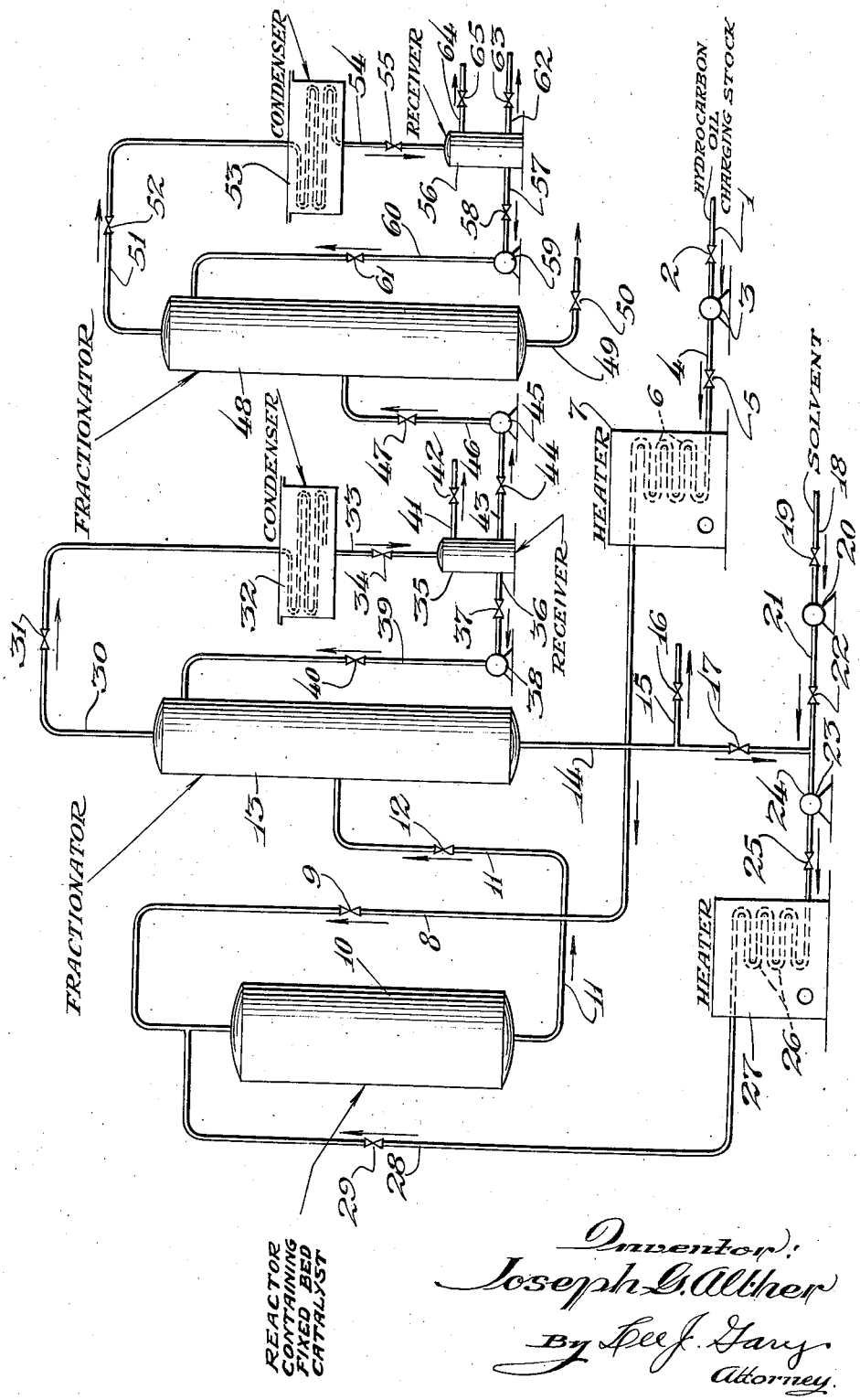

2,346,652

UNITED STATES PATENT OFFICE 2,346,652

CATALYTIC CONVERSION OF HYDROCARBONS

Joseph G. Alther, Chicago, Ill., assignor to Universal Oil Products Company, Chicago, Ill., a corporation of Delaware Application August 16, 1941, Serial No. 407,122

3 Claims. (Cl. 196—52)

This invention relates to improvements in the method of conducting catalytically promoted hydrocarbon conversion reactions such as the catalytic cracking and catalytic reforming of hydrocarbon oils as well as the dehydrogenation of paraffinic gases.

The present method of conducting certain hydrocarbon conversions such as the catalytic cracking of higher boiling hydrocarbon oils to produce lower boiling products including gasoline or the reforming of naphtha fractions to increase the octane number thereof, consists of heating the charge to a sufficiently high temperature to vaporize the same followed by superheating the vapors and passing them through a stationary bed of catalytically active contact material which may be disposed in an adiabatic reaction chamber or if desired, in a reactor of the heat exchange type. The catalysts which have been developed at the present time have not succeeded in eliminating various side reactions some of which lead to the formation of carbonaceous materials which deposit on the catalyst reducing and eventually destroying its catalytic activity. These hydrocarbon conversion processes conducted in the conventional manner are intermittent in character, it being necessary to reactivate the catalyst after a relatively short processing period. This reactivation is usually accomplished by burning the deleterious carbonaceous deposits from the catalyst in a stream of hot oxidizing gases. These oxidizing gases may comprise air but more often air diluted with relatively inert gases such as products of combustion. These products of combustion may be prepared by burning a fuel gas but more often are obtained by recycling the products of regeneration.

The material deposited on the catalyst does not consist of elementary carbon but rather a more complex substance which has a lower hydrogen to carbon ratio than the charging stock. The mechanism of the formation of this carbonaceous deposit is quite complex and, of course, not thoroughly understood. The deleterious deposit may be formed in part by the polymerization of unsaturated hydrocarbon fragments, the polymers thus formed losing a further portion of their hydrogen as they remain in contact with the catalyst.

In the process of my invention these carbonaceous materials are removed from the catalyst by washing the latter with a highly refractory liquid which has a negligible volatility under the conditions of operation. Such a refractory liquid may comprise poly-nuclear aromatic hydrocarbons but more particularly their chlorinated derivatives. For example, one might use highly chlorinated diphenylether or a highly chlorinated anthracene. These substances are relatively inert toward many of the catalysts employed in the conventional processes for converting hydrocarbons. In the operation of my process the highly refractory oil may be commingled with the charging stock, the mixture passed through a heating coil in the conventional manner so as to volatilize the reactants, the mixture of the hydrocarbon vapors and the liquid wash then being supplied to the upper surface of the fixed bed catalyst, both the wash and the reaction products being removed from the bottom of the reactor. If desired, the hydrocarbon reactants and the refractory wash material may be heated separately and again supplied to the upper surface of the catalyst bed or if desired, countercurrent flow may be used, the vaporous reactants supplied to the bottom of the reactor while the liquid wash is being supplied to the upper surface. Other refractory liquids may be used including the chlorinated diphenols and the chlorinated dinaphthols as well as the bromine derivatives of these substances.

These refractory liquids may be partially purified for reuse by distillation under greatly reduced pressure which will separate them from the unsaturated material formed in the hydrocarbon conversion process. This carbonaceous material is less volatile than the wash liquid and remains as a residue which may be discarded. The amount of the wash liquid needed may be of the order of 1 to 5% by volume of the charging stock, the quantity depending greatly upon the particular hydrocarbon conversion process.

The accompanying drawing illustrates diagrammatically the process flow of one embodiment of my invention.

Although the process of my invention is not to be considered as being limited to any particular hydrocarbon process, the method is illustrated in connection with catalytic cracking. The charging stock for the process which may consist of a gas oil is supplied to the system by way of line 1 wherein after passing through valve 2 it is supplied to pump 3, discharging through line 4, valve 5 to heating coil 6. The oil is heated in coil 6 by means of heat supplied by furnace 7, the temperature being raised to about 700° to about 950° F. with pressures which may be moderately superatmospheric, as for example 15 pounds per square inch gage. The heated oil vapors are then supplied to line 8 and pass through valve 9 after which they are commingled with the heated refractory oil obtained in a manner hereinafter set forth. The mixture of heated charging stock and refractory oil is then supplied to the catalyst in reactor 10, the hydrocarbon charging stock being in a gaseous state while the high boiling oil flows downwardly as a liquid film over the surface of the catalyst. The refractory oil acts as a solvent for the carbonaceous material that would normally form on the surface of the catalyst and thus prolongs the period before reactivation of the catalyst becomes necessary.

The mixture of reaction products and high boiling oils containing carbonaceous material in solution are directed from reactor 10 to line 11 where, after passing through valve 12, the mixture is supplied to fractionating column 13 wherein the high boiling oil is fractionated from the reaction products. This high boiling oil is removed as a bottoms product from the fractionating column by way of line 14, a portion being removed from the system by way of line 15, controlled by valve 16. This portion of the solvent may be recovered by distillation under reduced pressure or by a combination steam distillation and reduced pressure. The remainder of the high boiling liquid passes through valve 17 and is directed to line 21 wherein it is commingled with a fresh portion of high boiling solvent. This makeup portion of high boiling liquid is supplied to the system by way of line 18 wherein after passing through valve 19 it is supplied to pump 20, discharging into line 21, controlled by valve 22. The mixture of recycled solvent together with the makeup portion is then supplied to pump 23 which discharges through line 24, valve 25 into heating coil 26. This high boiling liquid is heated in coil 26 by means of furnace 27 to a temperature which is approximately the same as that to which the charge is being heated in coil 6, that is, from 700° to about 950° F. The heated solvent then enters line 28 and after passing through valve 29 is supplied to line 8 wherein it is commingled with the heated charging stock as hereinbefore set forth.

The overhead product from fractionating column 13 which consists of the hydrocarbon reaction products is supplied to line 30 and after passing through valve 31 enters cooler and condenser 32. The mixture of liquid together with the uncondensed and undissolved gases leaves cooler and condenser 32 by way of line 33 and after passing through valve 34 enters receiver and separator 35. A portion of the liquid collected in receiver 35 is returned to the fractionating column for cooling and refluxing, said portion of the liquid being supplied to line 36, valve 37 to pump 38 which discharges through line 39, valve 40. The uncondensed and undissolved gases collected in receiver 35 are removed from the system by way of line 41 controlled by valve 42. The remainder of the liquid collected in receiver 35, which contains the gasoline fraction together with the higher boiling insufficiently converted hydrocarbons, is directed by way of line 43, valve 44 to pump 45 which discharges through line 46, valve 47 to fractionating column 48. In column 48 the fraction boiling above the range of gasoline is separated from the lower boiling products, said high boiling fraction being removed from the system by way of line 49, controlled by valve 50. This higher boiling fraction may be used as a fuel oil or if desired may be returned to heating coil 6 for further cracking. The overhead product from fractionating column 48 consists of gasoline and lower boiling hydrocarbons and is directed into line 51 and after passing through valve 52 is supplied to cooling and condensing coil 53. The mixture of liquid together with undissolved and uncondensed gases leaving coil 53 enter line 54 and after passing through valve 55 is directed to receiver and separator 56. A portion of the liquid collected in receiver 56 is returned to column 48 for cooling and refluxing. This portion of the liquid enters line 57, passes through valve 58 and is supplied to pump 59 which discharges through line 60, valve 61 to the top of fractionating column 48. The remainder of the liquid collected in receiver 56 is removed by way of line 62, controlled by valve 63. It may be stabilized in a separate column to produce a motor fuel of the desired volatility. A small quantity of gases which may collect in receiver 56 are removed from the system by way of line 64, controlled by valve 65.

The above process described in connection with catalytic cracking may be modified so as to be adapted for such processes as the catalytic dehydrogenation of normally gaseous hydrocarbons, the aromatization of naphthas to increase their octane number and other hydrocarbon conversions conducted in the gaseous state.

I claim as my invention:

1. A process for the catalytic conversion of hydrocarbons in the gaseous state employing a fixed bed catalyst which comprises commingling with the charging stock a halogenated polynuclear compound which is relatively nonvolatile under the conditions of operation, supplying said mixture to the catalyst under conditions of temperature and pressure so as to maintain the charge in the vaporous condition, said halogenated polynuclear compound acting as a solvent for the carbonaceous material which would normally deposit on the catalyst thus decreasing its rate of contamination, maintaining a time of contact between the catalyst and charge sufficient to obtain the desired degree of conversion and recovering the reaction products from said catalytic process together with the aforementioned polynuclear compound containing in solution the aforesaid carbonaceous material.

2. In the catalytic conversion of hydrocarbons during passage thereof through a bed of catalyst upon which carbonaceous matter normally deposits, the improvement which comprises passing through the catalyst bed, during the hydrocarbon conversion therein, a refractory liquid comprising a halogenated polynuclear compound.

3. The improvement as defined in claim 2 further characterized in that the hydrocarbons and said liquid are passed through the catalyst bed in concurrent flow.

JOSEPH G. ALTHER.